(12) United States Patent
Frigo

(10) Patent No.: US 7,866,256 B2
(45) Date of Patent: Jan. 11, 2011

(54) SMOKER ATTACHMENT FOR A BARBECUE GRILL

(76) Inventor: Michael J. Frigo, 8231 Eynsford Dr., Orland Park, IL (US) 60462

( * ) Notice: Subject to any disclaimer, the term of this patent is extended or adjusted under 35 U.S.C. 154(b) by 578 days.

(21) Appl. No.: 11/748,922

(22) Filed: May 15, 2007

(65) Prior Publication Data
US 2007/0266863 A1 Nov. 22, 2007

Related U.S. Application Data

(60) Provisional application No. 60/800,711, filed on May 16, 2006.

(51) Int. Cl.
*A47J 37/07* (2006.01)
*A23B 4/044* (2006.01)
(52) U.S. Cl. .......................... 99/340; 99/482
(58) Field of Classification Search ............... 99/340, 99/482, 422–425, 444–449
See application file for complete search history.

(56) References Cited

U.S. PATENT DOCUMENTS

| | | | |
|---|---|---|---|
| 676,608 | A | 6/1901 | Hale |
| 1,010,169 | A | 11/1911 | Noreck |
| 2,076,479 | A | 4/1937 | O'Connell |
| 2,967,023 | A | 1/1961 | Huckabee |
| 3,910,782 | A | 10/1975 | Struble et al. |
| 4,574,770 | A | 3/1986 | Wells |
| 4,677,964 | A | 7/1987 | Lohmeyer et al. |
| 4,779,525 | A | 10/1988 | Gaines |
| 4,955,358 | A | 9/1990 | Harris et al. |
| 5,048,406 | A | 9/1991 | Cofer |
| 5,167,183 | A | 12/1992 | Schlosser et al. |
| 5,193,445 | A | 3/1993 | Ferguson |
| 5,368,009 | A | 11/1994 | Jones |
| 6,019,035 | A | 2/2000 | Jonas et al. |
| 6,102,028 | A | 8/2000 | Schlosser et al. |
| 6,257,130 | B1 * | 7/2001 | Schlosser .................. 99/482 |
| 6,502,504 | B1 | 1/2003 | Gschwind et al. |
| 6,701,829 | B2 | 3/2004 | Farrow |
| D585,702 | S | 2/2009 | Borovicka et al. |
| 2002/0166460 | A1 | 11/2002 | O'Shea |

(Continued)

OTHER PUBLICATIONS

Images of Perfect Flame™ "Five Burner Gas Grill" with "bonus smoker box," offered for sale by Lowes, at least as early as Apr. 11, 2007 (7 pages, 12 images).

*Primary Examiner*—Sang Y Paik
(74) *Attorney, Agent, or Firm*—Marshall, Gerstein & Borun LLP

(57) ABSTRACT

A smoker attachment for heating and burning smoking particles for a gas grill includes a housing and end caps. The housing is an elongate hollow member with a triangular cross-section. The housing has open ends and a slot just below the apex. A cavity of the housing holds the smoking particles. End caps cover the open ends. For flavoring food on a gas grill, the smoker assembly, filled with smoking particles, is used in place of one sear bar located directly above one of the gas burner tubes. Heat released from the gas burner tube directly below the base of the smoker attachment causes the smoking particles to ignite and smolder. This smoke flows through the slot in the housing and fills the grill area. During this process, the food being cooked on the grill is flavored by the smoke.

16 Claims, 7 Drawing Sheets

U.S. PATENT DOCUMENTS

2003/0177913 A1 9/2003 Dellinger
2003/0213378 A1 11/2003 Farrow
2005/0284461 A1 12/2005 Hsu

* cited by examiner

SMOKER ATTACHMENT FOR A BARBECUE GRILL

CROSS-REFERENCE TO RELATED APPLICATIONS

This application claims the benefit of priority of U.S. Provisional Patent Application No. 60/800,711, filed May 16, 2006, the contents of which are hereby incorporated herein in their entirety.

FIELD OF THE INVENTION

The present invention relates generally to outdoor cooking devices and, more particularly, to a smoker accessory for portable gas grills.

BACKGROUND

Portable gas grills have become increasingly popular in recent years because of the interest in outdoor cooking. Along with the popularity of outdoor grilling it has also become popular to add additional flavor to food cooked on these grills by using various devices to burn smoking particles (e.g., wood chips that have been soaked in water). As the smoking particles are burned, they produce smoke which fills the grill chamber and penetrates the food, giving it additional flavor. There are several different devices that are used for the smoking process, such as, for example, a smoker attachment disclosed in U.S. Pat. No. 6,102,028 that may be placed on top of the lava rocks or sear bars in existing grills or apparatuses that are built into a grill, as disclosed in U.S. Pat. No. 5,167,183, exclusively for the purpose of smoking food.

While these devices have received much consumer interest, they do not always produce the desired result in effectively providing the smoke required to flavor the food. This is primarily due to the amount of heat that is needed to ignite the smoking particles. Since these devices are not in direct contact with the heat source of the grill, the gas burners must be set at a high temperature in order to create the heat necessary to cause the smoking particles to ignite and begin to smolder. This can lead to cooking conditions that do not provide the intended smoke flavoring.

Some examples of what happens when using devices that are not in direct contact with the heat source are: 1) it takes a long time for the smoking particles to get hot enough to smolder which wastes fuel and adds extra time to the grilling process; 2) users begin to cook before the smoking particles begin to smolder—they either do not smolder or smolder too late in the cooking process causing little or no flavoring of the food; or 3) the food cooks too quickly due to the high level of heat needed for the smoking particles to ignite while not leaving enough time to absorb the smoke flavoring.

SUMMARY

The present invention is directed toward a device that is placed in direct contact with the heat source of the gas grill. This allows for the consistent control of the heat required to cause the smoking particles to ignite and provide a steady source of smoke to effectively flavor food.

More specifically, the smoker attachment may be inserted inside the gas grill in place of one or more of the sear bars (e.g., inverted "V"-shaped sear bars) that are located between the gas burners in the lower section and the cooking grid. The smoker attachment may be supported by the existing sear bar supports. Since the device is in direct contact with the heat source, users can effectively control the amount of heat required to cause the smoking particles to ignite and create the smoke required to flavor the food. Once the smoking particles begin to produce smoke, the heat can be reduced to the lowest temperature setting to allow for the food to slowly cook while absorbing the smoke flavoring. Most grills have 2 or 3 separate burners with separate temperature controls and the smoker attachment only requires the use of one burner—this allows for foods to be smoked at low temperatures.

If extended smoking time is required, additional smoker attachments can be used. In this embodiment, the additional attachment may be placed above any of the other burners and the burner may be ignited after the initial smoker attachment stopped producing smoke.

One embodiment of the smoker attachment includes an elongate cylindrically-shaped hollow member with a cross-section that is triangular in shape, and may include at least one opening just below the apex of the triangle (e.g., a slot that runs the length of the hollow member) to allow smoke to flow through the length of the attachment.

In another embodiment, the smoker attachment has removable end-caps which prevent smoke from escaping from the end of the unit during the smoking process and allow for easy access to replenish the attachment with new smoking particles prior to use and/or to remove used smoking particles and/or ashes if desired after use. The end caps may be permanently attached to the smoker attachment (e.g., by crimping) and the smoker attachment may be sold and used as a disposable item. Thus, the smoker attachment could be sold pre-filled with smoking particles, and once the smoking particles have been exhausted, the smoker attachment may be discarded or recycled.

In a other alternative embodiment, the smoker attachment may comprise a two-piece smoker attachment such that the length of the smoker attachment may advantageously be adjusted to fit different grills. For example, the two-piece smoker attachment may include a main body and an adjustable body. The main body may include inner dimensions sized and configured to receive the adjustable body in sliding relationship. So configured, the adjustable body may be slid into or out of the main body to adjust the overall length of the smoker attachment. In one embodiment, the main body and the adjustment body each have one end permanently sealed with a respective end cap. The end caps may be formed integral with the remainder of the bodies or may be formed separately from the bodies and subsequently fixed thereto via welding or some other means.

A smoker attachment in accordance with one or more of the embodiments, as described above, may be used to make portable gas grills more versatile to potential customers.

DETAILED DESCRIPTION

Figure 1:
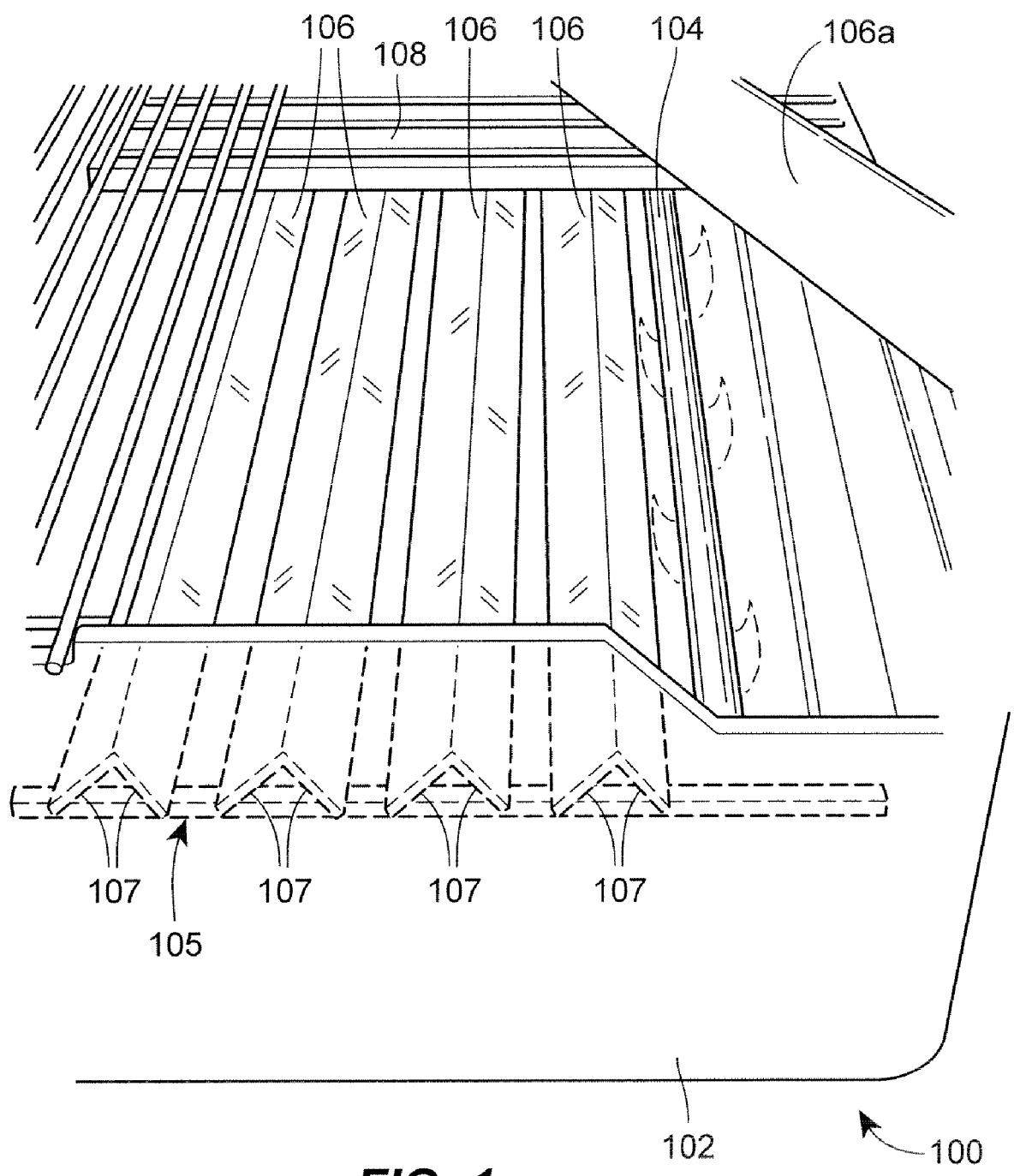
FIG. 1 is a partial perspective view of a gas grill with one of a plurality of sear bars removed to show a gas burner tube that may be disposed directly below a smoker attachment constructed in accordance with the present invention.

While this invention is susceptible of embodiment in many different forms, there is shown in the drawings and will herein be described in detail, one preferred embodiment of the invention, with the understanding that the present disclosure is to be considered as an exemplification of the principles of the invention, and is not intended to limit the broad aspect of the invention to the embodiments illustrated.

Figure 2:
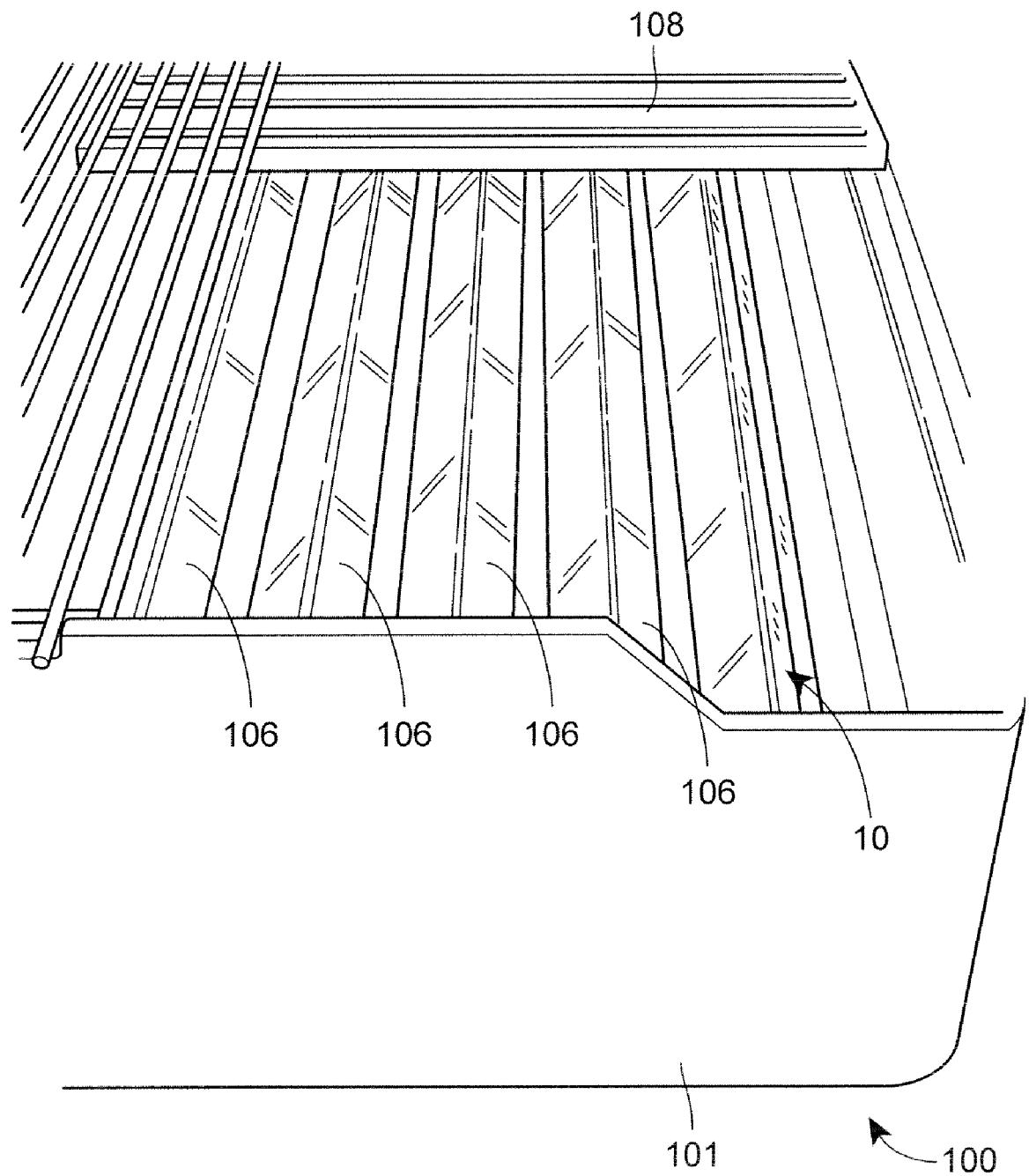
FIG. 2 illustrates one embodiment of a smoker attachment in accordance with the present invention positioned within the gas grill and directly above the gas burner tube illustrated in FIG. 1.

According to one aspect of the present invention, a smoker attachment 10 is provided for heating and burning smoking particles for a portable gas grill 100. For example, one conventional gas grill 100, which is depicted in FIGS. 1 and 2 includes a bottom chamber 102, a plurality of gas burner tubes 104 (only one of which is exposed in FIG. 1), a plurality of inverted V-shaped sear bars 106, and a grilling surface 108 such as a standard grill grate, for example. During normal operation, the plurality of sear bars 106 are disposed above respective gas burner tubes 104. As depicted in FIG. 1, a portion of the grilling surface 108 is removed to show four of five sear bars 106 installed within the grill 100 and one exposed gas burner tube 104. The first sear bar 106a at the front of the grill has been removed to expose the one gas burner tube 104 illustrated, such that a smoker attachment 10 constructed in accordance with the present invention may be installed within the gas grill 100. In one embodiment, when installed within the grill 100, each of the sear bars 106 are removably supported by a support structure such as a ledge 105 (shown in FIG. 1 only) integrally formed on opposing inner sidewalls of the bottom chamber 102. In one embodiment, the ledge 105 includes vertical or angled slots 107 for receiving the downward extending members of the inverted V-shaped sear bars 106, as illustrated.

FIG. 2 depicts a smoker attachment 10 that has been positioned to replace the sear bar 106a in accordance with the present invention. In the disclosed embodiment, the ends of the smoker attachment 10 are supported by the ledges 105 (shown only in FIG. 1) formed on the inner sidewalls of the bottom chamber 102 of the grill 100. However, it should be appreciated that in alternative embodiments, the smoker attachment 10 may be supported within the grill 100 by any support structure in any manner such that the smoker attachment 10 may be adapted to be supported in generally any similar grill. The grill supporting the smoker attachment 10 does not need to utilize ledges, but rather, the support structure may include brackets, fasteners, or any other device for supporting the sear bars 106 and/or smoker attachment 10. With the smoker attachment 10 positioned to replace the sear bar 106a, the smoker attachment 10 is located directly above the gas burner tube 104 (shown in FIG. 1), and therefore, in direct communication with any flame or other heat source provided therefrom. This ensures that the smoker attachment 10 is adequately heated to provide a desired smoking function, as will be discussed further below. It should also be appreciated that any of the sear bars 106 may be replaced by the smoker attachment 10 of the present invention. So configured, the smoker attachment 10 may be positioned directly above any of the gas burner tubes 104 to allow the flavoring of food which is cooked using the grilling surface 108 with a grill lid (not shown) of the gas grill 100 in a closed position.

While a gas barbecue grill 100 employing burner tubes 104 and inverted V-shaped sear bars 106 is described herein in conjunction with the smoker attachment 10, the present invention may be utilized with any type of barbecue grill having a bottom chamber 102 with an open top, a bottom, a heat source located in the bottom or cooking chamber and a conductive member such as the sear bars 106, for example, positioned between the heat source and the top of the bottom chamber.

Figure 3:
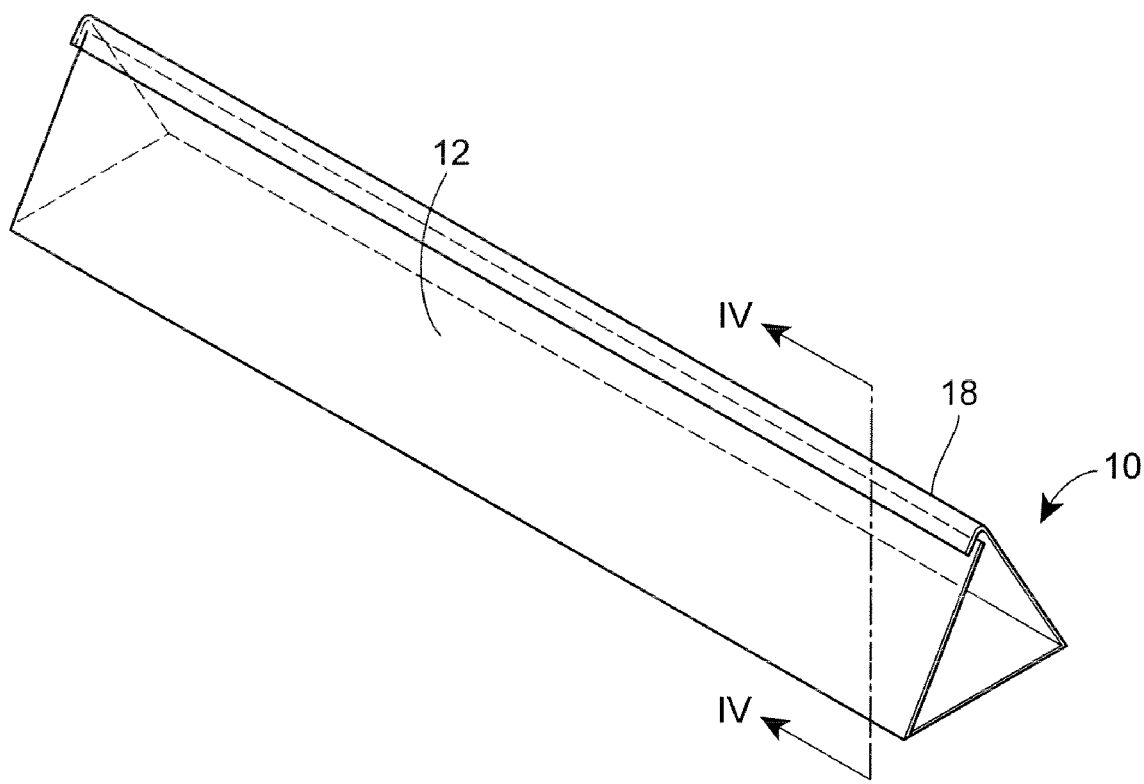
FIG. 3 is a perspective view of the smoker attachment of FIG. 2.
Figure 4:
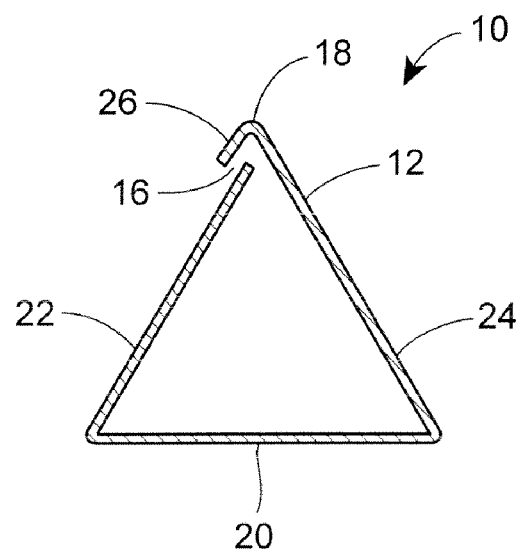
FIG. 4 is an end view of the smoker attachment of FIGS. 2 and 3.
Figure 5:
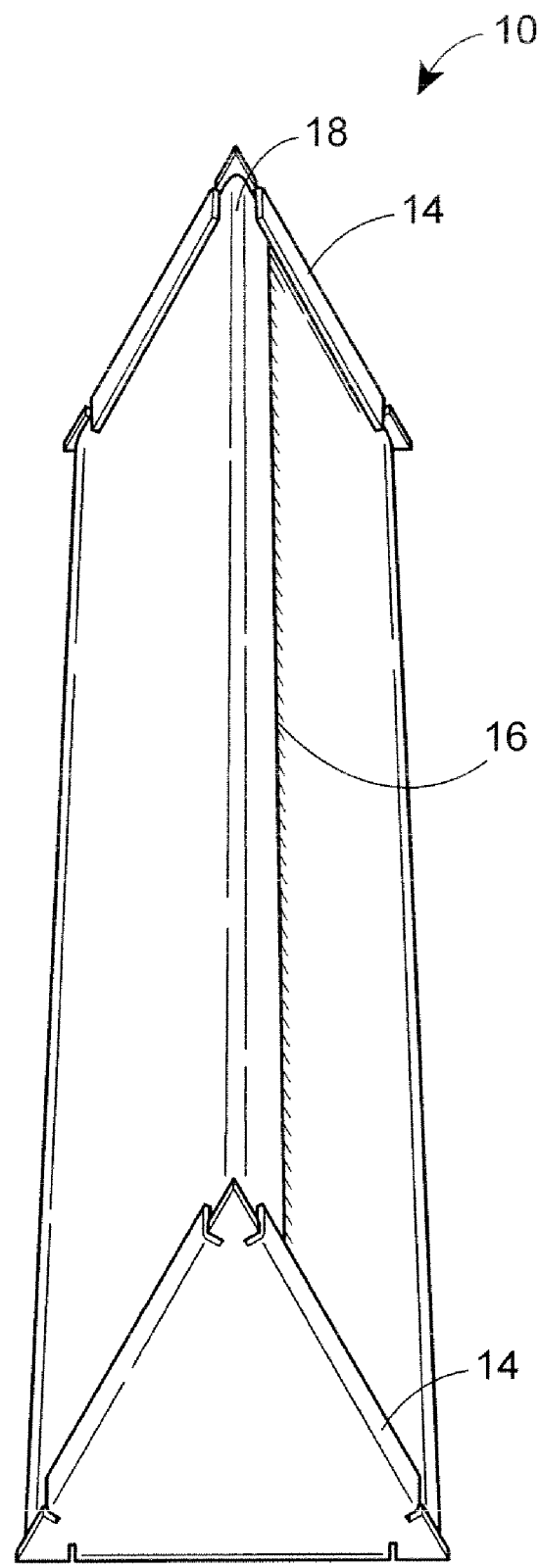
FIG. 5 is an end perspective view of the smoker attachment of FIGS. 2 and 3 showing end caps in place.

With reference generally to FIGS. 3-5, the smoker attachment 10 of the present embodiment comprises an elongated hollow main body or housing 12 and two end caps 14. The housing 12 defines an elongated cavity and the end caps 14, as shown in FIG. 5, enclose the ends of the main housing 12. The end caps 14 may be constructed in generally any manner separate from the main housing 12 and subsequently attached thereto by interference fit, welding, or any other means. For example, one end cap 14 may be permanently affixed to one end of the main housing 12, while the other may be removably attached to the other end of the main housing 12. So configured, the removably attached end cap 14 may be removed to allow a user to fill the cavity of the main body or housing 12 with smoking particles such as wood chips. Then, the end cap 14 may be positioned back onto the main housing 12 for use with the grill 100.

Figure 6:
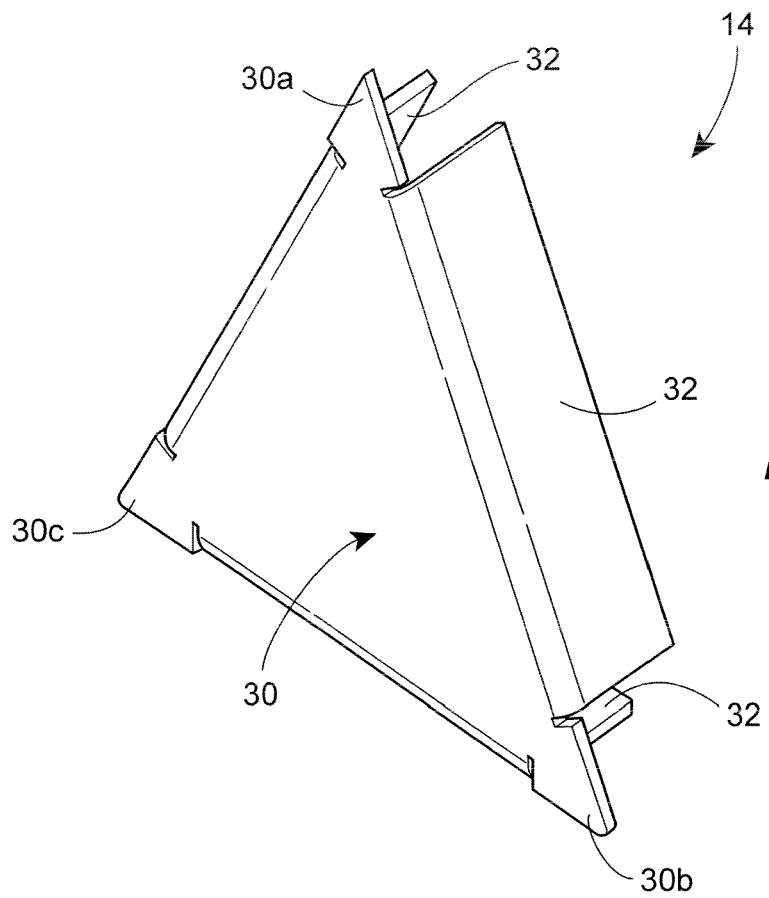
FIG. 6 is a perspective view of one embodiment of an end cap for a smoker attachment constructed in accordance with the present invention.
Figure 7:
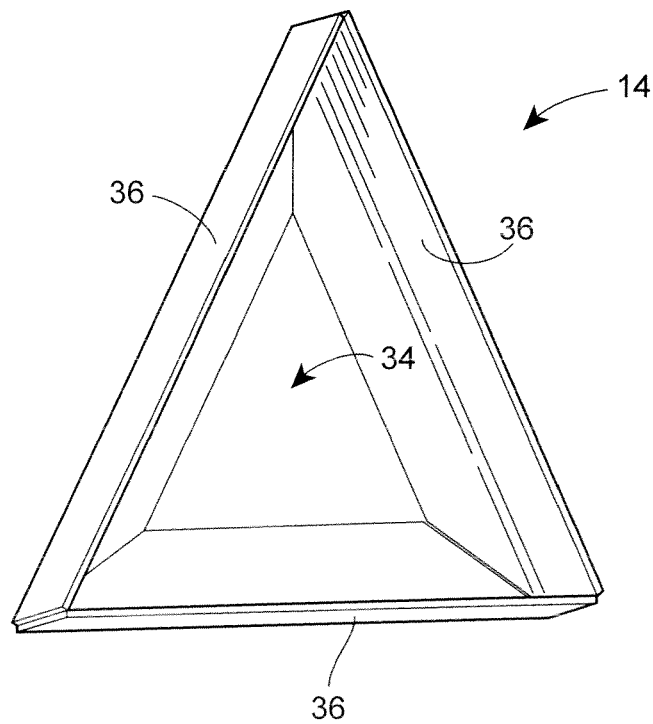
FIG. 7 is a perspective view of a second embodiment of an end cap for a smoker attachment constructed in accordance with the present invention.

FIGS. 6 and 7 depict two alternative embodiments of end caps 14. For example, in FIG. 6, one embodiment of the end cap 14 comprises a generally triangular shaped end plate 30 and a plurality of flange plates 32. The end plate 30 includes corners 30a-30c adapted to be positioned inside the ends of the main housing 12. The flange plates 32 are adapted to be disposed outside of the end of the main housing 12. However, in an alternative embodiment, the flange plates 32 may be adapted to be disposed inside the end of the main housing 12. FIG. 7 depicts another embodiment of an end cap 14, which comprises an end plate 34 and a plurality of flanges 36. The end cap 14 depicted in FIG. 7 is sized and configured to receive an end of the main housing 12 to close the end. Either or both embodiments of the end cap 14 may be permanently fixed to the main housing 12 via welding or some other means. Alternatively, either or both of the disclosed end caps 14 may be removably attached to the main housing 12 via frictional interference fit, for example. In another embodiment, the main housing 12 may include at least one end cap 14 integrally formed therewith. So configured, the integral end cap may be bent into position adjacent the end of the main housing 12 and subsequently welded or otherwise supplementally secured to the perimeter of the end of the main housing 12.

With reference back to FIGS. 3 and 4, the main housing 12 of the disclosed embodiment is constructed of one-piece of material and has a cross-section that is generally triangular in shape. The housing 12 includes an apex 18 and defines a slot 16 (shown in FIG. 4) generally adjacent to the apex 18. More specifically, the main housing 12 of the embodiment of the smoker attachment 10 depicted in FIGS. 3-5 comprises a base plate portion 20, two side wall portions 22 and 24, and an overhang portion 26.

As depicted, the base plate portion 20, sidewall portions 22, 24, and overhang portion 26 are arranged such that the cross-section of the smoker attachment 10 of the disclosed embodiment includes a generally equilateral triangle. However, alternative embodiments may include cross-sections that are non-equilateral triangles. Additionally, the sidewall portion 22 depicted in FIG. 4 is shorter than the sidewall portion 24. The overhang portion 26 is connected to the sidewall portion 24 at the apex 18 of the smoker attachment 10 and extends generally parallel to the sidewall portion 22. So configured, the overhang portion 26 and the sidewall portion 22 define the slot 16 as a covered slot, in that the overhang portion 26 covers the slot 16 to prevent grease or other materials generated from cooking food during the cooking process from falling into the smoker attachment 10. It should be appreciated that this configuration is merely one embodiment of the smoker attachment 10 and the present invention is not to be limited to this specific example.

Each component making up the smoker attachment 10 may be manufactured of porcelain-enamel coated steel. However, any other materials, including stainless steel and aluminum may be utilized. Moreover, the main housing 12 may be constructed of separate components welded together, or may be formed from a single piece of material, as mentioned above. Such unitary construction may advantageously eliminate welded joints and allow for the even flow of heat throughout the smoker attachment 10. Additionally, the end caps 14 of one embodiment may also be formed of the same piece of material as the main housing 12. The slot 16 at or near the apex 18 of the main housing 12 provides for the flow of smoke across the length of the smoker attachment 10 while the end caps 14 prevent smoke from escaping through the two ends and allow for easy access to fill the main housing 12 with smoking particles such as wood-chips, for example, and to remove the used particles and/or ashes. Additional slots, holes, and/or any other suitable openings may be provided in the main housing 12 instead of, or in addition to, the slot 16, for example. Additionally, an alternative embodiment of the smoker attachment 10 may have generally any cross-sectional geometry. For example, one alternative embodiment may include a circular cross-section, a square cross-section, a rectangular cross-section, or any other cross-section capable of serving the principles of the present invention. Further still, while the main housing 12 of the smoker attachment 10 has thus far been disclosed as being constructed of one-piece, alternative embodiments may be constructed of multiple pieces. For example, in one alternative embodiment, the overhang portion 26, for example, or some other lid, may be hinged to the remainder of the main housing 12 such that the smoker attachment 10 may be filled with smoking particles from the top.

The smoker attachment 10 may be seated parallel and directly above the gas burner tube 104, as depicted in FIG. 2. So positioned, a direct source of heat may be provided to the smoker attachment 10 to initially ignite the smoking particles. Moreover, this configuration allows for a consistent and direct source of heat to ensure continuous smoldering of the smoking particles while keeping the overall temperature of the grilling surface 108 low to allow foods to be cooked at a slower pace so that they can absorb the smoke flavoring.

The smoker attachment 10 provides many advantages. For example, it can be manufactured to adapt to gas grills that are constructed with a sear bar or sear plate mechanism that separates the gas burner tubes (heat source) from the grilling surface, as described above. Specifically, the smoker attachment 10 may be configured as a device that replaces an existing sear bar or sear plate (as a standalone unit), as described hereinabove. Alternatively, it may be configured as a device that can be attached to the existing sear bar or sear plate. For example, an alternative device could be used as an adapter to the grill's existing sear bar or sear plate to transform it into a smoker. The smoker attachment 10 may be configured to fit into current grill configurations, and may be configured to be positioned directly over the gas burners 104 so as to quickly ignite the smoking particles. The smoker attachment 10 allows for direct control of the heat source (gas burner tubes) required to ignite and sustain the smoking particles. The smoker attachment 10 may also be configured so that it provides for full enclosure of smoking particles (triangular, rectangular, etc.), with the slot 16, holes and/or vents on the top and/or in sidewalls to allow for the flow of smoke flavoring, and the smoker attachment 10 may be positioned directly above the heat source and directly below the grilling surface 108.

The embodiment of the smoker attachment 10 described thus far may be used as a single attachment or as multiple attachments depending on the length of desired cooking/smoking time and the number of gas burner tubes 104 in the grill 100, e.g. a separate smoker attachment 10 can be placed above each gas burner tube 104 and started (ignited) as needed. For example, one smoker attachment 10 may provide smoke for approximately 45 minutes. If additional smoking time is required, a second smoker attachment 10 could be placed above a different gas burner tube 104. After the first smoker attachment 10 stops producing smoke, the gas burner tube 104 under the second attachment 10 could be ignited and smoke from this attachment would be produced for another 45 minutes, for example. This configuration using two smoker attachments 10 would provide a total smoking time of 90 minutes, in this example. The configuration described above can be implemented for each gas burner tube 104 within the grill 100.

Figure 8:
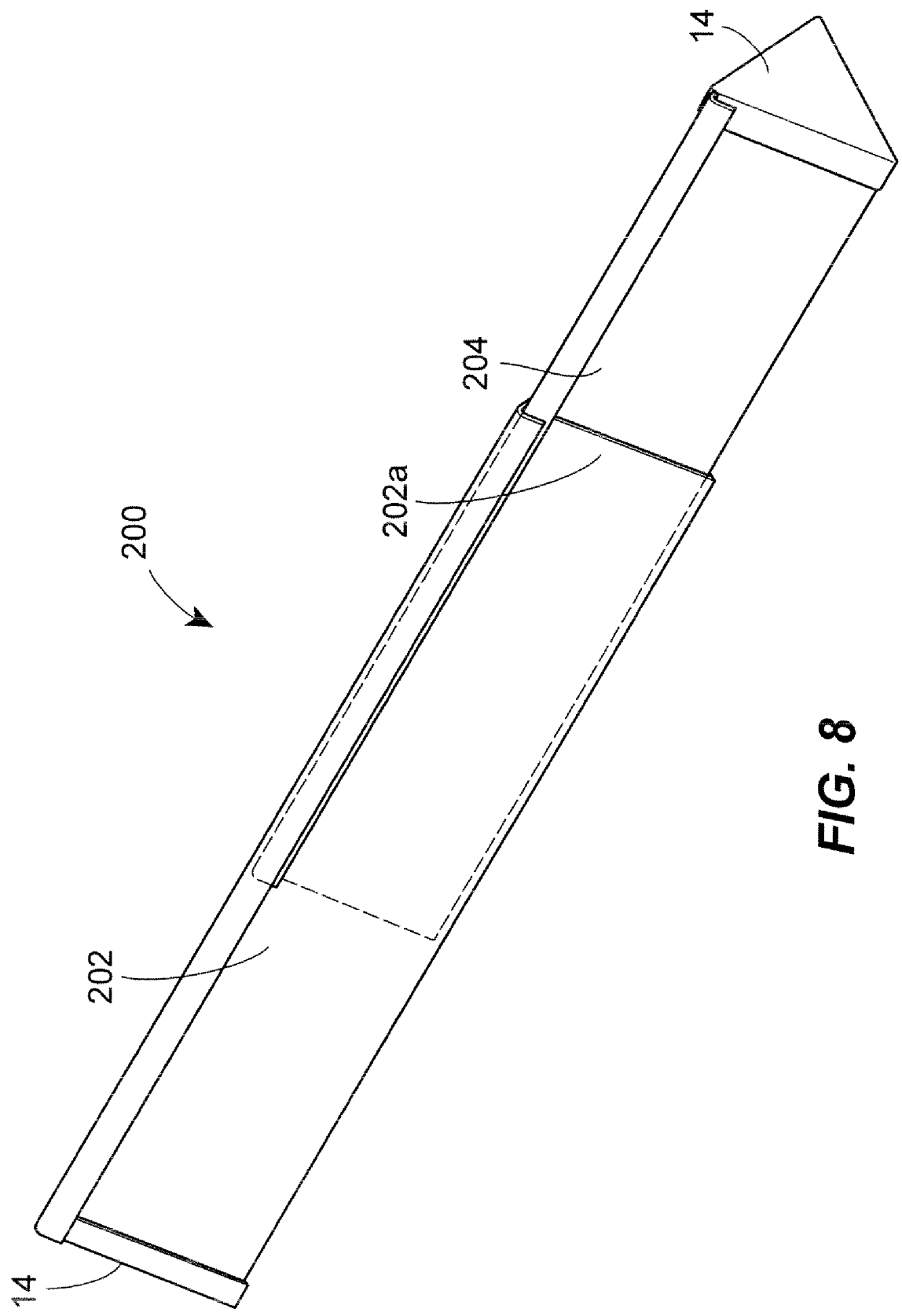
FIG. 8 is a perspective view of an alternative smoker attachment constructed in accordance with the present invention.
Figure 9:
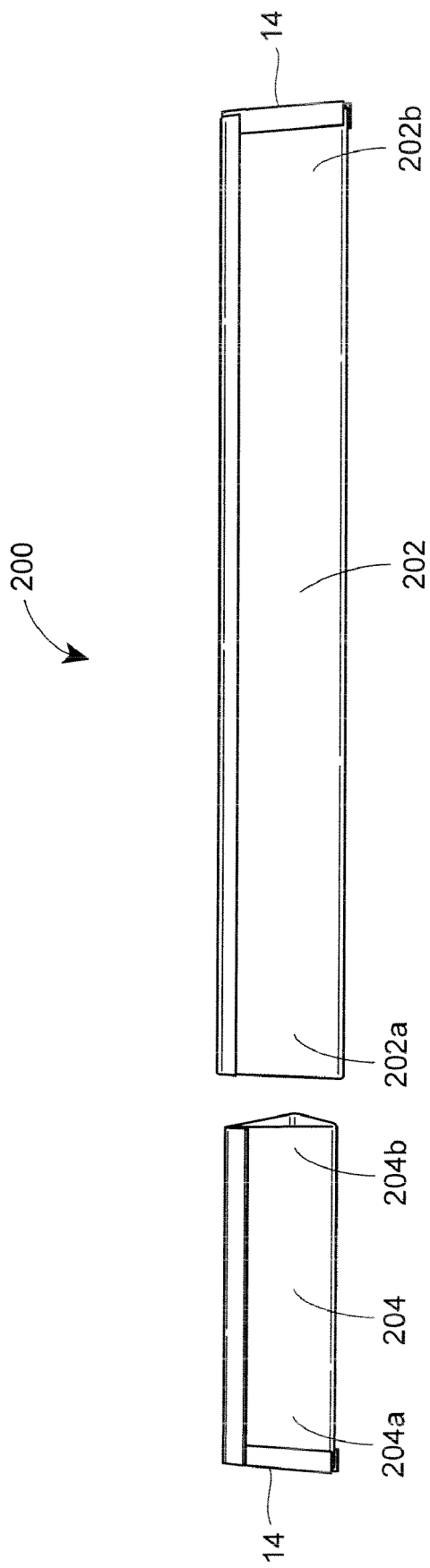
FIG. 9 is a partially exploded side perspective view of the smoker attachment of FIG. 8.

While the smoker attachment 10 described above is of a generally fixed length, an alternative embodiment of the present invention may include an adjustable-length smoker attachment. For example, FIGS. 8 and 9 depict an alternative smoker attachment 200 constructed in accordance with the principles of the preset invention. The smoker attachment 200 is a two-piece smoker attachment 200 having a main body 202 and an adjustment body 204. The main body 202 and adjustment body 204 each include an open end 202a, 204b, respectively, and a closed end 202b, 204a. The closed ends 202b, 204a include end caps 14, which may include end caps 14 similar to those described above with reference to FIGS. 6 and 7, or may include an end cap formed integral with the bodies 202, 204, as described above.

Additionally, the main body 202 and the adjustment body 204 have cross sectional geometries substantially similar to the cross-sectional geometry of the smoker attachment 10 described above with reference to FIGS. 1-5, and therefore the details will not be repeated.

One distinction between the main body 202 and the adjustment body 204, however, includes the cross-sectional dimensions of each. The main body 202 is sized and configured to slidably receive the adjustment body 204, as depicted in FIG. 8. So configured, the adjustment body 204 may be positioned relative to the main body 202 to advantageously allow a user to change the overall length of the smoker attachment 200 to function with different sized grills 100, for example. In one embodiment, the adjustment body 204 may include graduated markings pressed into or formed on a side thereof, thereby indicating to the user the total length of the overall smoker attachment 200. In another embodiment, the graduated markings may indicate a specific model of a grill that the specifically sized attachment 200 may be adapted to, for example. In still another embodiment, the adjustment body 204 may include projections raised from the sidewalls thereof and the main body 202 may include a plurality of corresponding dimples or holes for receiving the projections in a plurality of positions. So configured, the raised projections would removably snap into the dimples or holes. Each set of dimples or holes would provide for a different length smoker attachment 200 adapted for use with a different model, or size grill, for example.

Although certain embodiments of smoker attachments 10, 200 have been described herein in accordance with the teachings of the present disclosure, the scope of coverage of this patent is not intended to be limited thereto. On the contrary, this patent covers all embodiments of the teachings of the disclosure that fairly fall within the scope of permissible equivalents.

What is claimed is:

1. A smoker attachment for use with a gas grill having at least one gas burner tube and at least one sear plate removably disposed above the gas burner tube, the smoker attachment comprising:
    an elongate main body adapted to replace the at least one sear plate and to be removably attached to the gas grill in direct communication with a heat source generated by the at least one gas burner tube, the main body having a triangular cross-section defined by a base plate portion and first and second opposing sidewall portions converging upwardly from the base plate portion toward an apex, and an overhang portion extending from the second sidewall portion at the apex toward the first sidewall portion;
    an elongate cavity defined by the main body for containing smoking particles, the entire elongate cavity being disposed inside the triangular cross-section of the main body such that the elongated cavity is disposed above the base plate portion, below the apex, and between the first and second sidewall portions; and
    an opening defined by the main body for releasing smoke from the smoking particles, the opening being disposed between the first sidewall portion and the overhang portion and adjacent the apex.

2. The smoker attachment of claim 1, wherein the main body further comprises at least one open end and an end cap removably carried by the at least one open end.

3. The smoker attachment of claim 1, wherein the overhang portion extends at least partially over the opening.

4. The smoker attachment of claim 1, wherein the main body comprises a one-piece main body.

5. The smoker attachment of claim 1, further comprising an adjustable body, the adjustable body slidably attached to the main body such that an overall length of the smoker attachment is adjustable.

6. The smoker attachment of claim 1, wherein the opening comprises an elongate slot disposed adjacent to the apex.

7. A smoker attachment for use with a gas grill having a bottom chamber containing at least one gas burner tube and at least one sear plate disposed above the gas burner tube, the at least one sear plate being removably supported by a support surface carried by the bottom chamber, the smoker attachment comprising:
    an elongate one-piece main body having opposing first and second ends, the main body being adapted to be removably carried by the support surface when the at least one sear plate is removed, the main body having a triangular cross-section with an apex;
    a first end cap carried by the first end of the main body;
    an elongate cavity entirely defined inside the triangular cross-section of the main body and disposed below the apex and between the first and second ends, the elongate cavity being suitable for containing smoking particles;
    a slot extending at least partially between the first and second ends of the main body, the slot being disposed below the apex for releasing smoke from the smoking particles; and
    an overhang integrally formed with the main body, the overhang extending at least partially over the slot.

8. The smoker attachment of claim 7, further comprising a second end cap carried by the second end of the main body.

9. The smoker attachment of claim 8, wherein one of the first and second end caps is removably carried by the main body.

10. The smoker attachment of claim 7, wherein the main body comprises a pair of opposing sidewall portions converging toward the apex and the overhang portion extends from the apex to define the slot.

11. The smoker attachment of claim 7, further comprising an elongate secondary body having opposing first and second ends, the secondary body being slidably attached to the second end of the main body.

12. A smoker attachment for use with a gas grill having a bottom chamber containing at least one gas burner tube and at least one sear plate disposed above the gas burner tube, the at least one sear plate being removably supported by a support surface carried by the bottom chamber, the smoker attachment comprising:
    an elongate, one-piece main body having a base plate portion and opposing sidewall portions defining a triangular cross-section converging to an apex, the main body being adapted to be removably carried by the support surface when the at least one sear plate is removed;
    an elongate cavity defined by the main body, the entire elongate cavity having a triangular cross-section defined by inside surfaces of the triangular cross-section of the main body for containing smoking particles;
    a slot extending at least partially along the length of the main body adjacent to the apex, the slot for releasing smoke from the smoking particles; and
    an overhang integrally formed with the main body, the overhang extending at least partially over the slot.

13. The smoker attachment of claim 12, wherein the main body further comprises at least one open end.

14. The smoker attachment of claim 13, further comprising a first end cap removably carried by the at least one open end of the main body.

15. The smoker attachment of claim 12, wherein the opposing sidewall portions converge toward the apex and the overhang portion extends from the apex to define the slot.

16. The smoker attachment of claim 12, further comprising an elongate secondary body having a triangular cross-section, the secondary body being slidably attached to the main body such that length of the smoker attachment is adjustable.

* * * * *